US009317032B2

(12) United States Patent
Finkemeyer (10) Patent No.: US 9,317,032 B2
(45) Date of Patent: Apr. 19, 2016

(54) ROBOT AND METHOD FOR OPERATING A ROBOT

(75) Inventor: Bernd Finkemeyer, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 45 days.

(21) Appl. No.: 13/418,548

(22) Filed: Mar. 13, 2012

(65) Prior Publication Data

US 2012/0239190 A1 Sep. 20, 2012

(30) Foreign Application Priority Data

Mar. 14, 2011 (DE) .......................... 10 2011 005 513

(51) Int. Cl.
*G06F 19/00* (2011.01)
*G05B 19/414* (2006.01)
*B25J 9/16* (2006.01)

(52) U.S. Cl.
CPC .............. *G05B 19/414* (2013.01); *B25J 9/1628* (2013.01); *B25J 9/16* (2013.01); *G05B 2219/39233* (2013.01); *G05B 2219/39322* (2013.01)

(58) Field of Classification Search
CPC .................. B25J 9/06; B25J 9/10; B25J 9/01; B25J 9/1628; G05B 19/414; G05B 2219/39233; G05B 2219/39322; G06F 19/00
USPC .......... 701/22, 48, 50, 112; 700/3, 56, 86, 90, 700/245, 250, 259, 275, 280, 175; 900/1, 900/30; 318/568.12
See application file for complete search history.

(56) References Cited

U.S. PATENT DOCUMENTS 4,999,553 A * 3/1991 Seraji ............................ 700/245
5,430,643 A * 7/1995 Seraji ............................ 700/263
(Continued)

FOREIGN PATENT DOCUMENTS

CN 101100060 A 1/2008
DE 242 588 A1 2/1987

OTHER PUBLICATIONS

Bransicky, Multiple Lyapunov Functions and other analysis tools for switched and hybrid systems, IEEE, 1998.*
(Continued)

*Primary Examiner* — Jason Holloway
*Assistant Examiner* — Rachid Bendidi
(74) *Attorney, Agent, or Firm* — Wood, Herron & Evans, LLP (57) ABSTRACT

The invention relates to a method for operating a robot (R), and a correspondingly set-up robot. The robot (R) has a robot arm (M) having a plurality of members (1) following sequentially, an attaching device (3) for attaching an end effector (4, 46), and drives for moving the members (1), and a control device (S) connected to the drives. Stored in the control device (S) is a hierarchical regulating and control strategy having a plurality of differently prioritized regulating and control functionalities, and the method has the following process step: during the movement of the robot arm (M), switching over to a higher-prioritized regulating and control functionality, as soon as stable movement of the robot arm (M) by means of the higher-prioritized regulating and control functionality is possible, and an execution condition independent of the higher-prioritized regulating and control functionality is fulfilled.

6 Claims, 4 Drawing Sheets

(56) References Cited

U.S. PATENT DOCUMENTS

| | | | |
|---|---|---|---|
| 5,737,500 A * | 4/1998 | Seraji et al. | 700/251 |
| 2007/0162164 A1 * | 7/2007 | Dariush | 700/61 |
| 2007/0255454 A1 * | 11/2007 | Dariush | 700/245 |
| 2008/0009972 A1 * | 1/2008 | Nihei et al. | 700/245 |
| 2009/0271032 A1 * | 10/2009 | Kock et al. | 700/245 |

OTHER PUBLICATIONS

Liberzon, Basic problems in stability and design of switched systems, Systems and Control, (2003).*

Zlajpah et al. "Kinematic Control Algorithms for on-line Obstacle Avoidance for Redundant Manipulators", Oct. 2002, IEEE/RSJ.*

Hoffmann et al. "Biologically-inspired dynamical systems for movement generation: automatic real-time goal adaptation and obstacle avoidance", May 2009, IEEE.*

Mansard et al. "A Unified Approach to Integrate Unilateral Constraints in the Stack of Tasks", Jun. 2009, IEEE.*

Sentis et al. "A whole-body control framework for humanoids operating in human environments", May 2006, IEEE/ICRA.*

Omrcen et al. "Combined Torque and Velocity Control of a Redundant Robot System", Dec. 2006.*

Zlajpah et al. "Obstacle Avoidance for Redundant Manipulators as Control Problem", Mar. 2012.*

Sugiura et al. "Real-Time Collision Avoidance with Whole Body Motion Control for Humanoid Robots" Oct. 2007, IEEE/RSJ.*

Chiaverini "Singularity-Robust Task-Priority Redundancy Resolution for Real-Time Kinematic Control of Robot Manipulators", Jun. 1997, IEEE/TRA.*

Petric et al. "Smooth Transition Between Tasks on a Kinematic Control Level: Application to Self Collision Avoidance for Two Kuka LWR Robots", Dec. 2011, IEEE.*

Park, et al. "Movement reproduction and obstacle avoidance with dynamic movement primitives and potential fields", Dec. 2008, IEEE-RAS.*

Antonelli et al. "Stability Analysis for Prioritized Closed-Loop Inverse Kinematic Algorithms for Redundant Robotic Systems", Oct. 2009, IEEE.*

Dietrich et al. "Reactive whole-body control: Dynamic mobile manipulation using a large number of actuated degrees of freedom" May 2012, IEEE.*

Sentis "Compliant Control of Whole-Body Multi-Contact Behaviors in Humanoid Robots", 2010.*

Maciejewski et al "Obstacle avoidance for kinematically redundant Manipulators in Dynamically Varying Environments", Fall 1985.*

Nakamura et al. "Task-Priority Based Redundancy Control of Robot Manipulators", 1987, IJRR.*

German Patent Office; Office Action in German Patent Application No. 10 2011 005 513.4 dated Nov. 23, 2011; 5 pages.

Bernd Finkemeyer et al.; Aktionsprimitive: Ein universelles Roboter-Programmierparadigma; Oldenbourg Verlag 2005; 8 pages.

Bernd Finkemeyer et al.; Manipulation Primitives—A Universal Interface Between Sensor-Based Motion Control and Robot Programming; Springer-Verlag Berlin Heidelberg 2010; 26 pages.

Chinese Patent Office; Office Action in Chinese Patent Application No. 201210068650.0 dated Mar. 5, 2014; 12 pages.

* cited by examiner

| x direction | | y direction | |
|---|---|---|---|
| parameterizing | execution condition | parameterizing | execution condition |
| force (10N) | $F_{y\_error}^2 < \varepsilon$ | force (10N) | stop detected |
| speed (5 mm/s) | $F_{y\_error}^2 < \varepsilon$ | speed (5 mm/s) | stop detected |
| speed (10 mm/s) | stop detected | speed (15 mm/s) | no collision danger |
| distance (15 mm) | | speed (0 mm/s) | |
| speed (15 mm/s) | | | |

| Level | x Direction | y Direction | z Direction | Rotation |
|---|---|---|---|---|
| 0 | Position Regulation | Distance Regulation | Force Regulation | Force Regulation |
| 1 | Trajectory Planning | Position Regulation | Trajectory Planning | Trajectory Planning |
| 2 | | Trajectory Planning | | |

FIG. 5

ROBOT AND METHOD FOR OPERATING A ROBOT

The invention relates to a robot, and to a method for operating a robot.

Robots in general are manipulating machines, which are equipped with useful tools for automatic handling of objects, and are programmable in a plurality of motion axes, in particular with regard to orientation, position and process sequence. Robots usually have a robot arm with a plurality of members and programmable controllers (control devices), which control or regulate the motion sequences of the robot arm during operation. The drives are for example electric drives.

T. Kröger—, et. al., disclose in "Manipulation Primitives—A Universal Interface Between Sensor-Based Motion Control and Robot Programming," Robot Systems for Handling and Assembly, Springer Tracts in Advanced Robotics, Vol. 67, Springer Verlag, 2010, pages 293-313, a method for operating a robot, wherein switching occurs among different control and regulating functionalities or strategies during the automatic movement of the robot arm.

The object of the invention is to specify an improved method for operating a robot, and a robot set up accordingly.

The object of the invention is fulfilled by a method for operating a robot that has a robot arm having a plurality of members following in sequence, an attaching device for attaching an end effector, and drives for moving the members, and a control device connected to the drives, in which a hierarchical regulating and control strategy having a plurality of differently prioritized regulating and control functionalities is stored, having the following procedural step: during the movement of the robot arm, switching over into a higher-prioritized regulating and control functionality as soon as a stable movement of the robot arm by means of the higher-prioritized regulating and control functionality is possible, and an execution condition independent of the higher-prioritized regulating and control functionality is fulfilled.

Another aspect of the invention relates to a robot having
  a robot arm having a plurality of members following in sequence, an attaching device for attaching an end effector, and drives for moving the members, and
  a control device connected to the drives, in which a hierarchical regulating and control strategy having a plurality of differently prioritized regulating and control functionalities is stored, and which is set up to move the robot arm according to the method according to the invention.

According to the method according to the invention or the robot according to the invention, the automatic movement of the robot arm is carried out on the basis of a hierarchically structured regulating and control strategy, wherein an automatic switchover into a higher-prioritized regulating and control functionality occurs as soon as the higher-prioritized regulating and control functionality allows a stable movement of the robot arm. This is possible for example when sensor data or sensor signals are necessary for the regulating and control functionality in question, which are available only starting from a certain position, orientation or location (position and orientation) for example of the attaching device or of a tool center point assigned to the robot. Thus the robot is able to switch over automatically into the higher-prioritized regulating and control functionality, as soon as this is possible based on the control and regulating technology.

According to the invention, however, in addition the switchover into the higher-prioritized regulating and control functionality occurs only if the execution condition independent of the higher-prioritized regulating and control functionality is fulfilled. That makes it possible to describe the regulating and control strategy of the robot more precisely, and at the same time to achieve a relatively quick reaction of the robot to the switchover.

According to one embodiment of the method according to the invention, the invention has in addition the following process step: during the movement of the robot arm, switching over to a lower-prioritized regulating and control functionality as soon as the execution condition independent of the higher-prioritized regulating and control functionality is no longer fulfilled. The result of this is that when the execution condition is no longer present, the switchover occurs automatically into a lower-priority regulating and control function, by means of which the automatic movement of the robot arm is continued.

According to another embodiment of the method according to the invention, the method has in addition the following process step: during the movement of the robot arm, switchover to a lower-prioritized regulating and control functionality, as soon as a stable movement of the robot arm by means of the higher-prioritized regulating and control functionality is impossible. That reduces a danger of an unstable state of the robot.

According to one variant of the method according to the invention, the method may have regulating and control functionalities prioritized independently of each other for at least two degrees of freedom provided for the movement of the robot arm. It is then possible for a switchover among the different regulating and control functionalities to occur per degree of freedom and independently of each other.

For at least one of the degrees of freedom, a switchover to a higher-prioritized regulating and control function can take place as soon as a stable movement of the robot arm by means of the corresponding higher-prioritized regulating and control functionality is possible, and the execution condition independent of the higher-prioritized regulating and control functionality is fulfilled, at least for this degree of freedom. In particular, it can be provided that for each of the degrees of freedom in question a separate execution condition is provided, which is independent of the higher-prioritized regulating and control functionality assigned to the degree of freedom in question.

Preferably, the independent execution condition is assigned to a different degree of freedom than that of the regulating and control functionality in question. As a result, a regulating and control strategy that is favorable for the application can be implemented if necessary.

The execution condition can also be assigned to a safety condition of the robot. This may be realized for example by a collision monitoring system, so that for example a certain regulating and control functionality is carried out only if the collision monitoring does not detect any collision of the object moved by means of the robot arm. The safety condition can also be checked by a safety controller. The safety controller is in particular an external safety controller, for example an SPS, which is connected to the control device of the robot.

The method according to the invention offers, if appropriate, a relatively flexible and dynamic switchover among multiple regulating and control functionalities during the automatic movement of the robot arm.

In the marginal conditions, i.e., the execution condition, preferably all of the signals available to the control device are processed. The signal sources can be encapsulated in modules. The involved algorithms among which the switching is taking place can also be encapsulated in modules.

If different regulating and control functionalities are used for various degrees of freedom, in particular independently, then the alternative modules that may be present can be informed whether generated positioning and regulating values were used in the previous cycle. That is, it becomes possible to decide whether their positioning and regulating action was successful.

On the basis of the method according to the invention, it can be ensured if necessary that an alternative regulating or control unit is able to stabilize the system.

The possibilities for combining the control and regulating alternatives are preferably defined unambiguously in a command, for example by providing the application interface of the controller with a grammar, if appropriate, with which the switchover conditions and the involved modules can be defined unambiguously.

It can be provided that to each orthogonal degree of freedom in the assignment, i.e., during the automatic movement of the robot arm in the motion set, preferably at least one responsible module is assigned including target value and parameterizing to take over the control. In addition, one or more alternative modules may defined with corresponding target value and parameter set, which are assigned to the different regulating and control functionalities. The alternatives can be numbered continuously. The number assigned in this case can correspond to the priority of the alternative, i.e., the regulating and control functionality in question. For example, an original module or the regulating and control functionality with the highest priority may have the number 0. If this cannot be executed, the first alternative is chosen. It has the number 1. If it is also unable to assume the control, an attempt may be made to activate a second alternative with the number 2. This can be continued as necessary.

An execution condition can be transferred to each alternative selection. This is in particular a Boolean expression. It is possible for example in it to process any values known to the system or the control device. The values can come from all of the modules available in the system.

For example, there may be provision to set in the x direction of a Cartesian coordinate system a contact force with which the robot arm is for example to set down an object, and to set a camera position in the y direction of the Cartesian coordinate system for example with the aid of a camera system. For this purpose, a relatively precise first force regulating module (force regulating functionality) may selected for the x direction. This can be set up to set a contact force relatively precisely, or to move the robot arm in such a way that the desired contact force acts relatively precisely on the object moved by means of the robot. A prerequisite is however that a contact of the object with its surroundings has already been produced. It can be specified as an execution condition that the quadratic regulating error must lie within a constant E-environment. As long as this is not the case, there can be provision that a second force regulating module (force regulating functionality) takes over the control of the movement. This is optimized for example for producing the contact of the object with a surface. However, it is only activated if a contact force is already measurable. This is ensured for example with the execution condition "force>100N." If this is not fulfilled, a speed controller can assume the control of the movement of the robot arm. However, this occurs only under the boundary condition (execution condition), that for example a collision avoidance module reports no danger of a collision.

For this example, the camera system can be selected for the y direction and a corresponding boundary condition (execution condition) formulated. In this condition it can preferably be ensured that the camera system assumes the control of the movement of the robot arm only if a stable contact of the object with its surroundings has been produced in the x direction, and if the camera system for example has already recognized a positioning image feature. Otherwise the robot arm can be moved at a predefined speed until the image feature is recognized.

Every involved regulating and control module or every regulating and control functionality can also deliver a flag, for example in particular cyclically. This signals for example whether the assigned regulating and control functionality is capable in principle of taking over control of the movement of the robot arm. This is the case, for example, if it is set to "true." This flag can be required to always be tied to the execution condition "AND." That makes it possible to ensure that only stable control variables can be activated. The responsibility for stability thus resides in the corresponding module or the corresponding regulating and control functionality.

Internally, i.e., within the control device, all of the involved module signals for each control cycle can be gathered together and evaluated accordingly, as described. The result is in particular a control variable for each degree of freedom. This is then passed to the lower regulating and control layers.

If none of the specified alternative modules is able to take over the control, it is possible to switch over to a default backup controller. The only task of this backup controller is to stabilize the movement of the robot arm. It does not contribute to fulfilling the object of the current application. An error message can therefore be generated to the application, which can respond to it appropriately.

Every regulating and control module or every regulating and control functionality can report in the following cycle (in the following control cycle) about whether the control variable which it generated came to be used. The corresponding regulating and control module may require this information in order to be able to generate a stable control variable for the current cycle. This prevents integrators which may be used from overflowing and interpolators from continuing to run without the robot actually following.

Examples of exemplary embodiments of the invention are depicted in the accompanying schematic drawing. The figures show the following.

Figure 1:
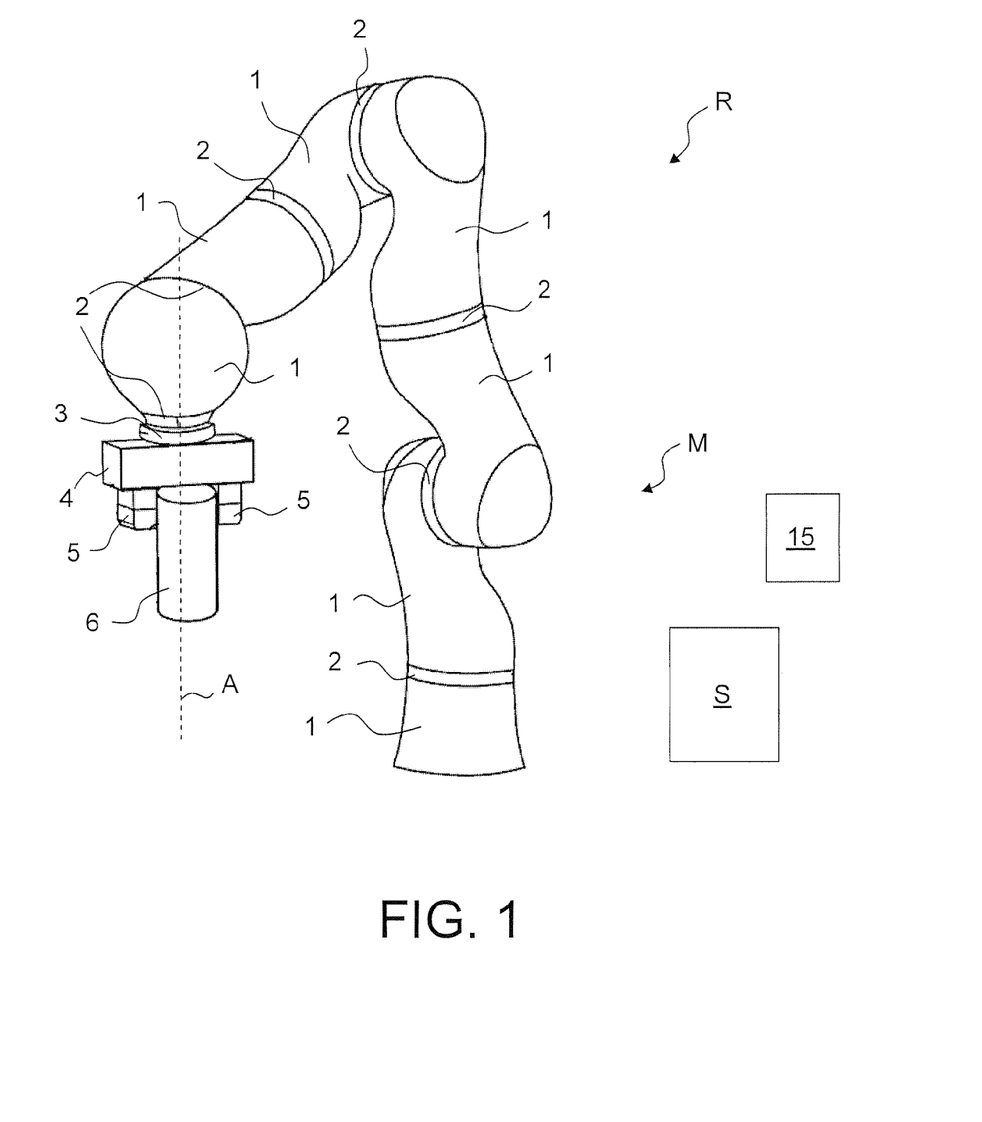
FIG. 1 a robot having a robot arm and a control device.

FIG. 1 shows a robot R which has a robot arm M and a control device S. The robot arm M constitutes essentially the movable part of the robot R, and includes a plurality of members 1 following each other in sequence which are connected to each other by means of joints 2. At one of its ends the robot arm M has an attaching device 3 for example in the form of a flange, to which for example an end effector in the form of a gripper 4 can be attached. The gripper 4 has for example gripping jaws 5, by means of which the gripper 4 can hold an object 6 so that the latter can be moved by means of the robot R. The gripper 4 with gripped object 6, the attaching device 3 and parts of the robot arm M are shown in additional detail in FIG. 2.

The robot arm M also has drives connected to the control device S, not shown in further detail, by means of which the members 1 can be moved relative to each other in reference to axes assigned to the joints 2. In the case of the present exemplary embodiment, the figures show only one of the axes A in reference to which the attaching device 4 can be moved directly, in particular rotated.

The drives are for example electric drives, and are actuated by the control device S in particular in automatic operation of the robot R, so that the attaching device 3 or a so-called tool center point of the robot R automatically carries out a predetermined movement. To this end, a corresponding user program runs on the control device S. The control device S can be designed in particular in such a way that it regulates the drives in automatic operation. The gripper 4 is also connected to the control device S, so that the latter is able to control a gripping and releasing of the object 6.

In the case of the present exemplary embodiment, the gripper 4 has a force and torque sensor 7, a camera 8 and a distance sensor 9, which are likewise connected to the control device, so that signals generated by the force and torque sensor, the camera 8 and the distance sensor 9 are available to the control device S.

Figure 2:
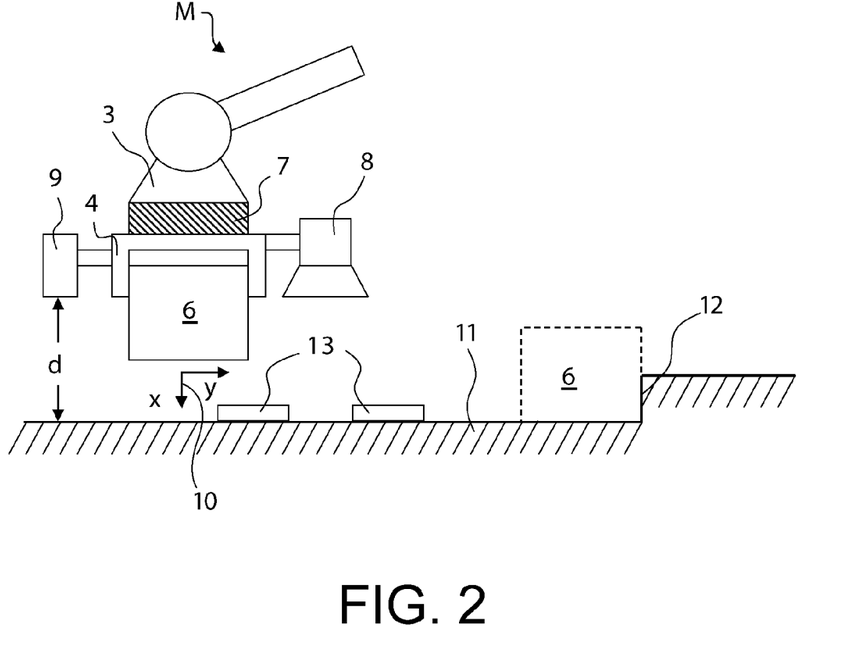
FIG. 2 an end effector in the form of a gripper, which grips an object and is attached to an attaching device of the robot arm, FIG. 3 a table that illustrates the operation of the robot, FIG. 4 another end effector in the form of a gripper, which grips an object and is attached to the attaching device of the robot arm, and FIG. 5 another table.

In the exemplary embodiment shown is FIG. 2, the camera 8 is set up in particular to deliver images from the direction of thrust of the gripper 4, and the distance sensor is set up to determine a distance d likewise in the direction of thrust of the gripper 4. If the gripper 4 is set up for example in such a way that its direction of thrust is oriented in the x direction of a Cartesian world coordinate system 10, then in the case of the present exemplary embodiment the camera 8 and the distance sensor 9 are likewise oriented in the x direction of the coordinate system 10. This is illustrated in FIG. 2. The direction of thrust of the gripper 4 is oriented in particular in the direction of the axis A shown in FIG. 1.

In the case of the exemplary embodiment illustrated in FIG. 2, the robot R is intended to set the object gripped by means of the gripper 4 on the floor 11 at a stop 12. The object 6, when set down at this destination position, is depicted in FIG. 2 with dashed lines. In order to move the object 6 to its destination position and set it down there, there is a regulating and control strategy stored in the control device S, in particular as part of the user program, which is summarized in a table shown in FIG. 3.

In the case of the present exemplary embodiment, it is provided that at the destination position the object 6 is in contact with the surface of the floor 1 and with the surface of the stop 12. To that end, the control device S is designed to realize a force regulation based on signals generated by the force and torque sensor 7, a position regulation based on signals generated by the camera 8, and a distance regulation based on signals generated by the distance sensor 9. In particular, the control device S is set up to realize different regulating and/or control strategies independently of each other in different directions and/or orientations or degrees of freedom of the gripper 4. In addition, it may be necessary to prevent collisions on the way to the destination position with interferences or obstacles 13 unknown in advance.

In the case of the present exemplary embodiment, the following items of information or signals are available to the control device S on the basis of the camera 8, the distance sensor 9 and the force and torque sensor 7:

- a measured force F, from which for example a quadratic error $F_{y\_error2}$ can be calculated in the y direction in reference to a target force,
- on the basis of the signals coming from the camera 8, the control device S can detect the obstacles 13 and thus recognize a danger of collision during the movement of the object 6 and the stop 12. This can be used for example for a regulation of position in the y direction.

The following control and regulating functionalities are also provided:
- force regulation, in particular Cartesian force regulation based on the force and torque sensor 7, to achieve a prescribed target force Fsoll with which the object 6 is to touch the floor 11 and the stop 12,
- speed control, in particular Cartesian speed control (trajectory planner and interpolater), with which the object 6 is to move when operated in this mode,
- distance regulation based on the distance sensor 9.

Figure 3:
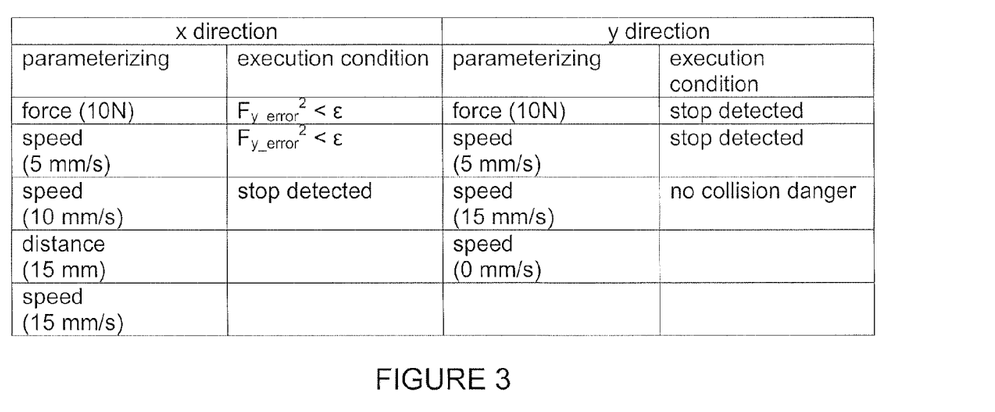

In the case of the present exemplary embodiment, the control device S realized the hierarchical regulating and control structure summarized by the table in FIG. 3, and thus a change of state from one regulating and/or control functionality to the other.

In the case of the present exemplary embodiment, the control device S moves the robot arm M by means of trajectory planning in such a way that the object 6 is moved at least to the vicinity of the destination position. The obstacles 13 are recognized on the basis of the signals generated by the camera 8.

When the object 6 has approximately reached the destination position, the control device S sets the contact force of for example 10 N in both the x and the y directions on the basis of the signals generated by the force and torque sensor 7. The force regulation for the x and y directions is therefore activated with the highest priority. However, this is only active if the force regulation system has reported readiness to regulate (necessary criterion), and if an execution condition (sufficient criterion) is fulfilled. For the x direction this means for example that the object 6 has already reached the stop 12, so that the contact force in the y direction already lies within a prescribed tolerance range. In the y direction, on the other hand, the force regulation is only activated if the object 6 is already in the vicinity of the stop 12.

If the necessary or sufficient criterion should not be fulfilled, the next, lower-priority alternative is tested: Here the attempt is made to switch over the the speed control in both degrees of freedom, i.e., in the x and y directions, in order to move to the contact with the defined speed. If the object 6 is already at the stop 12, i.e., if the contact force in the y direction is within the tolerance range, the motion proceeds in the x direction with a comparatively low speed. The motion likewise proceeds in the y direction with a relatively low speed, if the stop 12 has been recognized on the basis of the signals generated by the camera 8.

As long as the stop 12 has not yet been recognized, the distance regulation is activated in the x direction, or if its necessary criterion is not fulfilled (distance measurement by means of the distance sensor 9 not possible), the speed control. Using the distance regulation, it is possible to ensure that a distance d from the floor 11 is maintained when approaching the stop 12. In the y direction, on the other hand, the motion in the direction of the stop 12 proceeds at a comparatively high speed, as long as no danger of a collision is detected.

If a danger of collision is detected and no higher-prioritized control or regulation alternative fulfills the corresponding necessary and sufficient criteria, the speed is reduced to zero.

The control device S is thus set up to realize relatively complex changes of state from one control and regulating functionality to the other.

In summary, the results are as follows: Every control and regulating functionality has a priority. A necessary criterion must be fulfilled in order to be able to activate a particular control and regulating functionality. That ensures the stability of the corresponding control and regulating functionality; that is, the functionality decides whether the robot R can be controlled or regulated in a stable manner with this control and regulating functionality. In addition, a sufficient criterion, in particular one that is freely definable, must be fulfilled. The result of that is for example that the control and regulating functionality is utilized in the correct context of the application.

The switchover from one control and regulating functionality to the other can take place in both directions (for example, speed regulation to force regulation and vice versa). The switchover takes place in particular within a control cycle of the control device S, whereby preprocessing waiting times or other activation delays can be avoided. The decision is made in particular "by reflex" within the control cycle, so that a slower application or process control is not required.

The switchover can take place for each degree of freedom, independently of each other. Any signals desired can be utilized for a possibly used Boolean expression of the sufficient execution condition or of the sufficient criterion. These can be either raw or processed sensor signals, intermediate results of control and regulation functionalities, and/or results of monitoring, planning and estimating algorithms.

Figure 4:
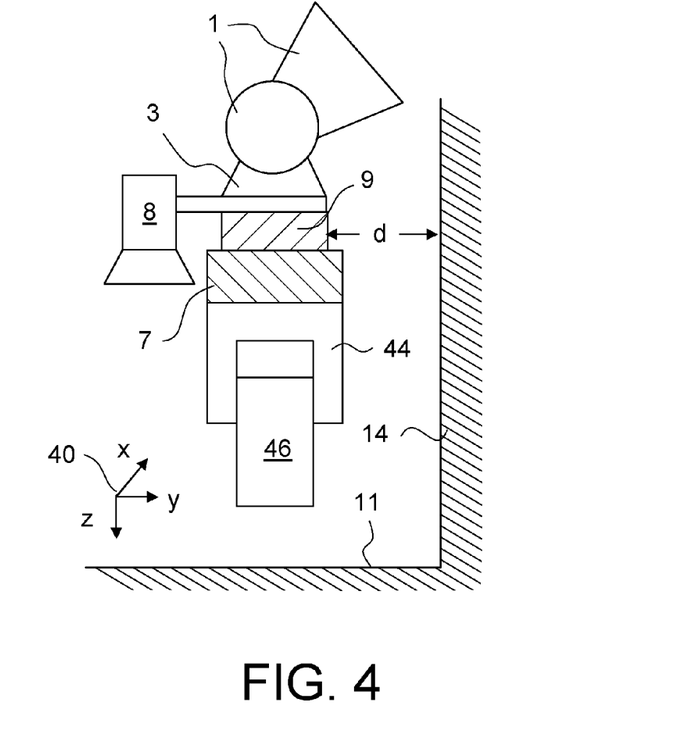

FIG. 4 shows an alternative gripper 44, that can be attached to the attaching device 3 of the robot arm M instead of the gripper 4 shown in FIG. 2. In the case of the present exemplary embodiment, the gripper 44 likewise includes the force and torque sensor 7, the camera 8 and the distance sensor 9, which are likewise connected to the control device S, so that signals generated by the force and torque sensor 7, the camera and the distance sensor 9 are available to the latter.

In the exemplary embodiment shown in FIG. 4, the camera 8 in particular is set up to take two-dimensional pictures of the plane perpendicular to the direction of thrust of the gripper. The distance sensor 9 is set up to ascertain a distance d in the direction perpendicular to the direction of thrust of the gripper 44. For example, if the gripper 44 is oriented in such a way that its direction of thrust is oriented in the z direction of a Cartesian world coordinate system 40, then in the case of the present exemplary embodiment the camera 8 is set up to take two-dimensional pictures in the x-y plane of the coordinate system 40, and the distance sensor 9 is oriented in the y direction of the coordinate system 40. This is illustrated in FIG. 4. The camera 8 serves in particular as a position measuring system, which determines the relatively rough location of the destination position in the x and y directions. This information can be utilized for position regulating in the x and y directions.

Figure 5:
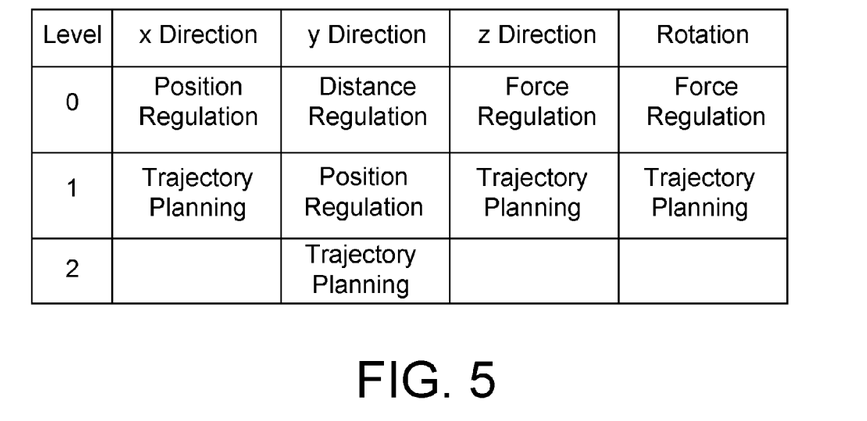

In the case of the exemplary embodiment illustrated in FIG. 4, the robot R is supposed to place an object 46 gripped by means of the gripper 44 on the floor 11 at a prescribed distance $d_{soll}$ from a side wall 14. In order to move the object 46 to its destination position and place it there, a regulating and control strategy is stored in the control device S, which is summarized in a table shown in FIG. 5.

The control device S first actuates the drives of the robot arm M in such a way that the latter moves the object 46 along a prescribed trajectory at least approximately to the destination position of the object 46.

As soon as it is possible for the degree of freedom in the x direction of the coordinate system 40 to continue the movement in the x direction by means of camera-based position regulation, the control device S switches automatically to position regulation for this degree of freedom. The control device S recognizes the possibility of position regulation in the x direction on the basis of signals generated by the camera.

As soon as it is possible for the degree of freedom in the y direction of the coordinate system 40 to continue the movement in the y direction by means of position regulation, the control device S switches automatically to position regulation for this degree of freedom as well. The control device recognizes the possibility of position regulation in the y direction as well on the basis of signals generated by the camera 8. If the object 46 has moved close enough to the side wall 14 so that the distance sensor 9 can ascertain the distance 9 reliably, then the control device switches automatically to distance regulation for the y direction.

As soon as it is possible for the degree of freedom in the z direction of the coordinate system 40 to continue the movement in the z direction by means of force regulation, the control device S switches automatically to force regulation for this degree of freedom. The control device S recognizes for example the possibility of force regulation in the z direction on the basis of signals generated by the force and torque sensor 7, which are assigned to a minimum force on the gripper 44 or the object 46 and ascertained by means of the force and torque sensor 7.

For the degrees of freedom relating to the remaining 3 degrees of freedom (orientation and rotation) of the gripper 46, in the case of the present exemplary embodiment a switchover is likewise made from trajectory planning to force regulation, as soon as this is possible.

Consequently, for the described regulating and control strategy to the next-higher prioritized one, a necessary criterion must be fulfilled in each case, so that a certain higher-prioritized control and regulating functionality can be or is activated. That ensures the stability of the corresponding control and regulating functionality; that is, the functionality decides whether the robot R can be controlled or regulated in a stable manner with this control and regulating functionality.

In addition, a sufficient criterion, in particular a freely definable one, must also be fulfilled for the switchover into the higher-prioritized control and regulating functionality. This is fulfilled for example by detecting the surroundings using sensors. The necessary criterion may result for example on the basis of a current state of another degree of freedom, or may be a safety criterion, for example that a switchover into a higher-prioritized control and regulating functionality takes place only if certain prescribed or prescribable safety rules are fulfilled. Thus it is possible, for example, that an external safety controller 15, which is connected to the control device S of the robot R, registers a "veto" for example if for example the robot R is too close to a singular position for position regulation, since then there could be a danger of exceeding axis speeds. Likewise, the safety controller 15 could prevent the activation of regulating circuits, if the robot R is in an operating mode in which certain regulating circuits based on external sensors are forbidden for safety reasons (for example, start-up mode). In the same way, the safety controller 15 can prevent switching over to regulating and control functionalities which can be dangerous for the user if the robot R is to close to the edge of a workspace, or if even persons are present in the working space.

The method according to the invention cannot be used for automatic operation, but in other robot operating modes (for example, startup or manual processing), in which the robot arm M is moved automatically with the help of the control device S.

The invention claimed is:

1. A method of operating a robot including a robot arm controlled by a control device, the robot arm comprising a plurality of sequentially arranged links, an attaching device for attaching an end effector, and drives for moving the links, the control device having a hierarchical control strategy that includes a plurality of differently-prioritized control functionalities, the method comprising:

operating the robot arm in a first control functionality, and not in a second, higher-prioritized control functionality;

determining when an execution condition that is independent of the second, higher-prioritized control functionality exists;

when the execution condition exists, switching control from the first control functionality to the second, higher-prioritized control functionality during movement of the robot arm when stable movement of the robot arm is possible with the second control functionality;

wherein the plurality of control functionalities includes control functionalities for moving the robot arm in at least two degrees of freedom, and wherein the control functionalities for movement of the robot arm in one of the at least two degrees of freedom are independent of control functionalities for moving the robot arm in the other of the at least two degrees of freedom, the method further comprising:

switching between control functionalities for movement of the robot arm in one of the at least two degrees of freedom independently of switching between control functionalities for moving the robot arm in the other of the at least two degrees of freedom;

determining when at least one of the following events occurs:

a) the execution condition no longer exists, or b) stable movement of the robot arm no longer being possible using the higher-prioritized control functionality; and switching from the second, higher-prioritized control functionality to a lower-prioritized control functionality during the movement of the robot arm if at least one of the events occurs.

2. The method of claim 1, wherein switching to the higher-prioritized control functionality occurs for at least one of the two degrees of freedom in response to stable movement of the robot arm by the higher-prioritized control functionality being possible and if the execution condition exists for the at least one of the two degrees of freedom.

3. The method of claim 1, wherein switching to the higher-prioritized control functionality occurs for at least one of the two degrees of freedom in response to stable movement of the robot arm by the higher-prioritized control functionality being possible and if the execution condition exists for the other of the at least two degrees of freedom.

4. The method of claim 1, wherein the execution condition is assigned to a safety condition of the robot.

5. The method of claim 4, further comprising:

checking the safety condition by a safety controller.

6. A robot, comprising:

a robot arm including a plurality of sequentially arranged links, an attaching device for attaching an end effector, and a plurality of drives for moving the links; and a control device operatively coupled with the drives and having a hierarchical control strategy that includes a plurality of differently-prioritized control functionalities for controlling the arm;

wherein the plurality of control functionalities includes control functionalities for moving the robot arm in at least two degrees of freedom, and wherein the control functionalities for movement of the robot arm in one of the at least two degrees of freedom are independent of control functionalities for moving the robot arm in the other of the at least two degrees of freedom;

wherein the control device, switches from operating in a first control functionality, and not in a second higher prioritized control functionality, to operating in the second higher-prioritized control functionality during a movement of the robot arm in response to stable movement of the robot arm being possible using the higher-prioritized control functionality and the fulfillment of an execution condition that is independent of the higher-prioritized control functionality;

wherein the control device switches between control functionalities for movement of the robot arm in one of the at least two degrees of freedom independently of switching between control functionalities for moving the robot arm in the other of the at least two degrees of freedom; and wherein the control device further:

determines when at least one of the following events occurs:

a) the execution condition no longer exists, or b) stable movement of the robot arm no longer being possible using the higher-prioritized control functionality, and switches from the second, higher-prioritized control functionality to a lower-prioritized control functionality during the movement of the robot arm if at least one of the events occurs.

\* \* \* \* \*